United States Patent
St-Denis et al.

(10) Patent No.: US 6,345,037 B2
(45) Date of Patent: *Feb. 5, 2002

(54) METHOD AND APPARATUS FOR AUTO DETECTION OF AAL5 TYPE FRAMES

(75) Inventors: Bernard St-Denis; John Pillar, both of Nepean; Bernard Marchand, Cantley, all of (CA)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,353

(22) Filed: Dec. 23, 1997

(51) Int. Cl.[7] .............................. H04L 1/00; H04L 12/28
(52) U.S. Cl. ........................................ 370/230; 370/395
(58) Field of Search .............................. 370/252, 254, 370/354, 384, 385, 395, 396, 399, 409, 431, 432, 433, 464, 465, 469, 471, 235, 229, 230, 236

(56) References Cited

U.S. PATENT DOCUMENTS

| 5,425,029 A | * | 6/1995 | Hluchyj et al. | 370/395 |
|---|---|---|---|---|
| 5,490,140 A | * | 2/1996 | Abensour et al. | 370/235 |
| 5,548,587 A | * | 8/1996 | Bailey et al. | 370/395 |
| 5,557,607 A | * | 9/1996 | Holden | 370/235 |
| 5,572,522 A | * | 11/1996 | Calamvokis et al. | 370/395 |
| 5,583,861 A | * | 12/1996 | Holden | 370/395 |
| 5,592,476 A | * | 1/1997 | Calamvokis et al. | 370/395 |
| 5,604,743 A | * | 2/1997 | Le Guigner et al. | 370/392 |
| 5,694,390 A | * | 12/1997 | Yamato et al. | 370/236 |
| 5,745,488 A | * | 4/1998 | Thompson et al. | 370/395 |
| 5,751,698 A | * | 5/1998 | Cushman et al. | 370/252 |
| 5,828,653 A | * | 10/1998 | Goss | 370/230 |
| 5,838,677 A | * | 11/1998 | Kozaki et al. | 370/389 |
| 5,867,480 A | * | 2/1999 | Thomas et al. | 370/230 |
| 5,946,312 A | * | 8/1999 | Suzuki | 370/395 |
| 6,122,253 A | * | 9/2000 | Jones | 370/235 |

OTHER PUBLICATIONS

David E. McDysan and Darren L. Spohn, ATM Theory and Application, McGram–Hill, 1994, pp. 235–235.*

* cited by examiner

Primary Examiner—Chau Nguyen
Assistant Examiner—Chiho Andrew Lee
(74) Attorney, Agent, or Firm—Allan P. Millard

(57) ABSTRACT

In Asynchronous Transfer Mode (ATM) communications networks, certain congestion control features, such as Partial Packet Discard (PPD) and Early Packet Discard (EPD), operate on ATM cells that have been segmented from ATM Adaptation Layer #5 (AAL5) frames (packets). AAL5 frames are automatically detected by observing transitions of an indicator in the ATM cell header unique to AAL5 traffic. Automatic detection of AAL5 traffic allows enablement of packet discard techniques such as PPD and EPD.

10 Claims, 3 Drawing Sheets

METHOD AND APPARATUS FOR AUTO DETECTION OF AAL5 TYPE FRAMES

BACKGROUND OF THE INVENTION

The present invention relates to the automatic detection of frames in an asynchronous transfer mode (ATM) communications network. More particularly, the present invention relates to the use of automatic detection of ATM Adaptation Layer #5 (AAL5) frames in an ATM switch to determine whether ATM cells arriving at the switch are part of an AAL5 frame.

Identification of the use of AAL5 allows enablement of features such as Partial Packet Discard (PPD) and Early Packet Discard (EPD), as well as variations on PPD and EPD such as Late Packet Discard (LPD) and Random Early Discard (RED), all of which operate only on AAL5 traffic. Such cell discard techniques are known in the art and used to control congestion in an ATM network. These methods operate on AAL5 frames, also referred to in the art as AAL5 packets, which can contain up to 64 kB of payload information segmented into ATM cells. In PPD, once an ATM switch has dropped an ATM cell from an AAL5 frame, then the switch should drop the remaining ATM cells belonging to the same AAL5 frame, except possibly the last cell. The remaining cells are dropped since AAL5 cannot reconstruct the frame at the destination switch absent the dropped cell. Since the source must retransmit the entire frame, it drops the remaining cells in the frame to prevent unnecessary transmission and use of bandwidth.

Unlike PPD, which acts on cells belonging to frames which have already had some cells admitted to output buffers, EPD acts on cells belonging to frames which have not had any cells admitted to the output buffers. If the available buffer space cannot accommodate all the cells from an AAL5 frame, EPD drops all cells in the frame. Since the source would have to retransmit the entire frame anyway if only cells not accommodated by the buffers were dropped, EPD prevents unnecessary transmission by simply dropping all the cells in the frame before initial transmission. EPD, like PPD, thus serves to prevent unnecessary consumption of network resources, such as buffer space and bandwidth.

When an ATM switch receives a request to set up a new Virtual Channel Connection (VCC), the switch may not know whether the connection will carry AAL5 frames or only individual ATM cells using, e.g., AAL1, AAL2, AAL3/4, or a proprietary AAL protocol. Because packet discard methods operate only on AAL5 frames, an ATM switch must be aware of whether or not the ATM cells it receives are part of an AAL5 frame in order to apply a packet discard strategy. One approach to the problem of determining traffic type at the ATM switch has been to use the optional signaling information element (IE) to identify the traffic as type AAL5. However, because the IE for signaling the AAL type is optional, this method is not always available. A second approach to the problem has been to require an operator having personal knowledge of the type of traffic on the circuit to provision features such as PPD and EPD when the switch initially sets up the circuit. While this is a workable solution for a Permanent Virtual Connection (PVC), it suffers from additional administrative costs and time. For a Switched Virtual Connection (SVC), this solution is not viable, because operator intervention is not possible every time the switch receives a setup request for an SVC.

It is desirable, therefore, to provide a scheme for automatically detecting the presence of AAL5 frames on a VCC without relying on the signaling IE or operator intervention. With automatic detection of AAL5 frames, an ATM switch can enable features such as PPD and EPD in order to protect switch resources and ensure fair treatment among connections. As yet, no ATM standards provide automatic detection of whether a connection carries data that has been segmented using AAL5.

SUMMARY OF THE INVENTION

This invention satisfies those desires by providing a mechanism for automatically detecting the presence of AAL5 frames on a connection.

A method consistent with the present invention determines whether ATM user data cells passing through an ATM switch carry data that has been segmented using AAL5 by monitoring the state of a bit in each cell and identifying the cells as carrying data that has been segmented using AAL5 when the state of the bit transitions from a first value to a second value. Another method consistent with the present invention determines whether user data cells passing through an ATM switch carry data that has been segmented using AAL5 and enables a packet discard feature if they do carry data that has been segmented using AAL5. Yet another method consistent with the present invention controls congestion of cells on a connection in an ATM switch by conditionally enabling a packet discard feature if the AAL type is unknown when the connection is established, monitoring the state of a bit in each cell, and enabling the packet discard feature when the state of the bit transitions from a first value to a second value.

Apparatus and networks are also provided for carrying out methods consistent with the present invention.

The advantages accruing to the present invention are numerous. Automatic detection schemes consistent with the present invention, when integrated into an ATM switch, are cost-effective techniques for determining the type of traffic received at the switch. Advantageously, the present invention enhances the application of ATM packet-wise congestion control features such as PPD and EPD by providing mechanisms for enabling such features upon detection of an AAL5 frame. The inventive schemes function automatically and require no use of optional IEs or human intervention.

The above desires, and other desires, features, and advantages of the present invention will be readily appreciated by one of ordinary skill in the art from the following detailed description of the preferred implementations when taken in connection with the accompanying drawings.

DETAILED DESCRIPTION OF THE PREFERRED EMBODIMENTS

Figure 1:
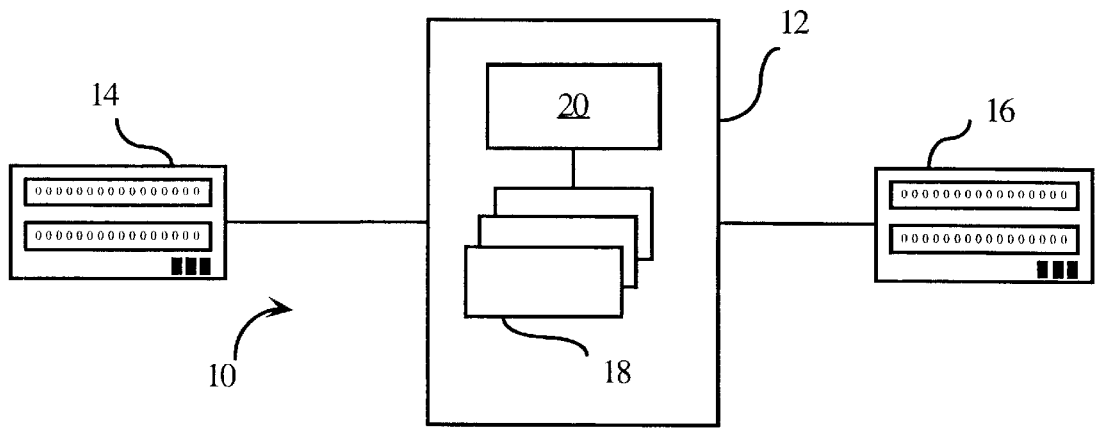
FIG. 1 is a high level diagram of an ATM network in which an automatic detection scheme for AAL5 frames consistent with the present invention may be implemented.

FIG. 1 depicts a high level block diagram of an ATM network, shown generally by reference numeral 10, within which an automatic detection scheme consistent with the present invention may function. Such a scheme may be implemented with any ATM layer device capable of carrying higher layer protocol units of data, e.g., AAL5 frames, that have been broken into smaller units, e.g., ATM cells. A typical example of such an ATM layer device is ATM switch 12, which transmits packets or frames of data split into ATM cells for transmission over network 10, using, e.g., AAL5. ATM switch 12, which may be one of a plurality of switches in network 10, not specifically shown for the sake of clarity, provides a switched connection between, for example, ATM routers 14 and 16, which in turn serve traffic from end systems or nodes, not particularly shown.

With continuing reference to FIG. 1, ATM switch 12 contains at least one buffer 18 which queues ATM cells passing through the switch. Buffers 18 may be input buffers or output buffers. Packet discard strategies such as PPD and EPD drop ATM cells before or after they enter buffers 18. Consistent with the present invention, queue manager 20 manages buffer operations. More specifically, queue manager 20 contains a mechanism consistent with the present invention for enabling packet discard features such as PPD and EPD after determining that ATM cells passing through the switch belong to an AAL5 frame.

Figure 2:
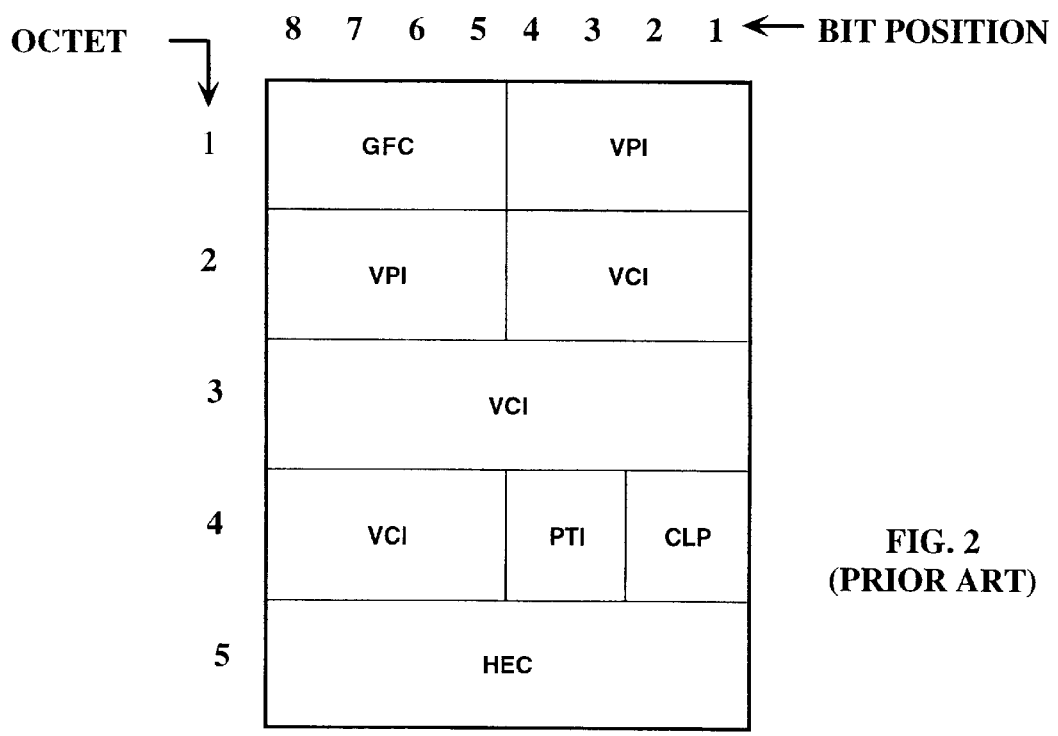
FIG. 2 illustrates the contents of an ATM cell header.

An ATM switch consistent with the present invention identifies ATM cells belonging to AAL5 frames by using the cell delineation characteristic present in AAL5-type ATM cells. Standard ATM cells are of a fixed length, i.e., 53 bytes, of which 48 bytes carry payload data and 5 bytes carry header information. FIG. 2 illustrates the contents of an ATM cell header according to the ATM Forum User-Network Interface (UNI) standard. The header contains a 4-bit Generic Flow Control (GFC) field, an 8-bit Virtual Path Identifier (VPI) field, a 16-bit Virtual Channel Identifier (VCI) field, a 3-bit Payload Type Identifier (PTI) field, a Cell Loss Priority (CLP) bit, and an 8-bit Header Error Control (HEC) field. The ATM Forum Network-Network Interface (NNI) standard header is similar, but the GFC field is replaced by an additional 4 bits in the VPI field.

The PTI field, which has eight possible values, performs several functions. The first bit (bit 4 of octet 4 in FIG. 2) distinguishes user data cells from management information cells. A value of "0" indicates a user data cell, whereas a value of "1" indicates a management cell. For user data cells, the second bit (bit 3 of octet 4 in FIG. 2) indicates whether the cell has encountered congestion. A value of "0" indicates no congestion has occurred, and a value of "1" indicates congestion. For user data cells, the third bit (bit 2 of octet 4 in FIG. 2) is used exclusively in ATM cells created from AAL5 frames to indicate whether a cell is the last cell of an AAL5 frame. A value of "0" indicates Continuation of Message (COM), i.e., there are more cells segmented from the frame, and a value of "1" indicates End of Message (EOM), i.e., the cell is the last one segmented from the frame. Table 1 below summarizes PTI values for user data cells, in which the first bit is always "0."

TABLE 1

| PTI Value | Congestion? | AAL5 frame indicator |
|---|---|---|
| 0 0 0 | No | More cells in the frame |
| 0 0 1 | No | Last cell in the frame |
| 0 1 0 | Yes | More cells in the frame |
| 0 1 1 | Yes | Last cell in the frame |

Figure 3:
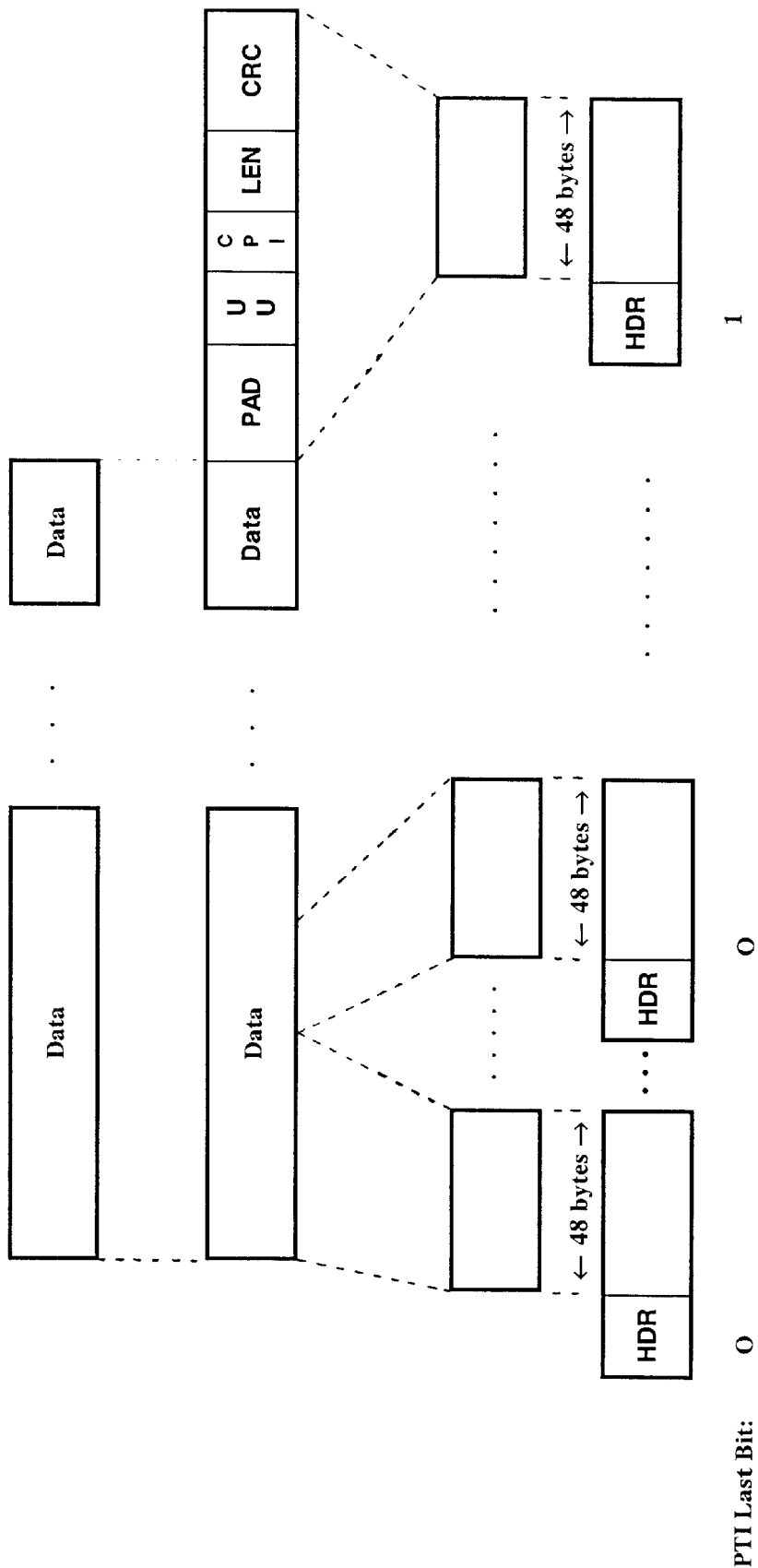
FIG. 3 illustrates the segmentation of a data packet into ATM cells according to the AAL5 protocol.

Referring now to FIG. 3, there is shown a segmentation of a data packet into ATM cells according to the AAL5 protocol. The AAL5 protocol operates by segmenting a large data unit into ATM cells. An ATM adapter, known in the art, adds trailer information to the data unit. The trailer consists of a 4-byte Cyclic Redundancy Check (CRC) field, a 2-byte packet length field (LEN), two reserved bytes for User-to-User information (UU) and the Common Part Indicator (CPI), and padding (PAD), such that the total length of the resulting packet is a multiple of 48 bytes. The adapter then segments the data into 48-byte units of information. Finally, a 5-byte ATM cell header (HDR) is added to each 48-byte unit to create 53-byte ATM cells. The last bit of the PTI field is set to 0, or COM, in every ATM cell except the last (i.e., the ATM cell containing the trailer), in which the last bit of the PTI field is set to 1, or EOM.

Referring once again to FIG. 1, queue manager 20 consistent with the present invention automatically detects the presence of ATM user data cells belonging to AAL5 frames by monitoring the transitions of the last bit of the PTI field as ATM cells pass through switch 12 on a virtual channel connection (VCC). This is possible since AAL5 is the only AAL type using the last PTI bit for any purpose in user data cells. When queue manager 20 observes a transition from 0 (COM) to 1 (EOM), it records the presence of AAL5 traffic. The queue manager or other mechanism within the switch can then use this knowledge to enable features, such as PPD and EPD and other features that apply only to AAL5 protocol.

Figure 4:
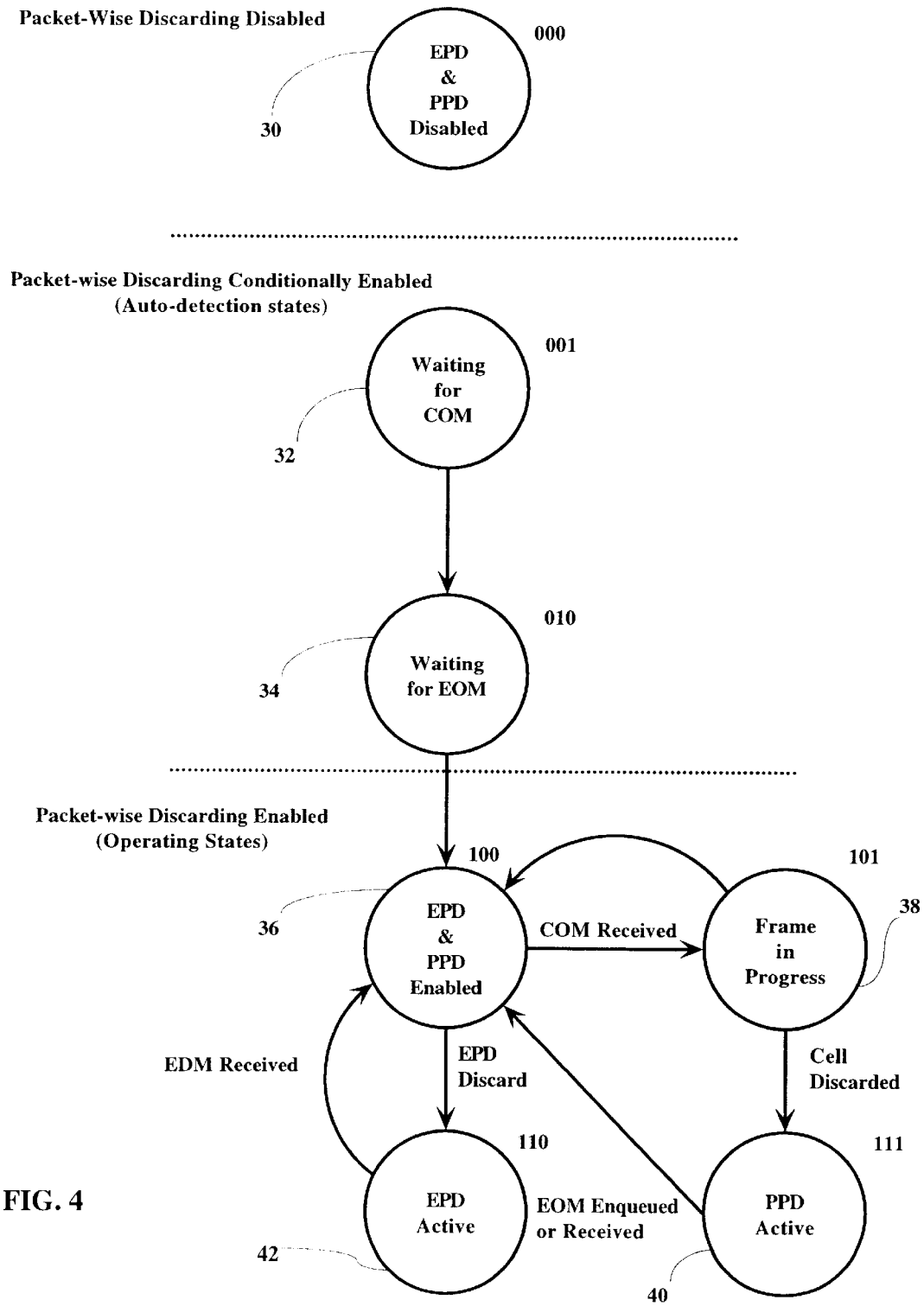
FIG. 4 represents a state diagram of enablement of packet discard features consistent with the present invention.

FIG. 4 is a state diagram illustrating states and transitions between them consistent with the present invention. In FIG. 4, the queue manager uses the automatic detection of AAL5 to enable packet discarding features such as PPD and EPD in the ATM switch. There are at least three sets of states in which the inventive mechanism may operate: packet discarding disabled, packet discarding conditionally enabled (i.e., the auto-detection states), and packet discarding enabled (i.e., PPD and EPD operating states).

When a connection is established and the ATM switch operator has knowledge that packet-wise discarding is inappropriate (e.g., when using a non-standard AAL which uses the last PTI bit for other purposes than delineating frames) the operator disables packet discard techniques by placing the connection in state 30 ("EPD & PPD Disabled"). On the other hand, if the operator knows the cells are part of an AAL5 frame, the operator can enable packet discard techniques, placing the connection in the first operating state, i.e., state 36 ("EPD & PPD Enabled"), and bypassing the auto-detection states. When the operator has no knowledge of the AAL type, however, the queue manager conditionally enables packet discarding on the connection, placing the connection into state 32 ("Waiting for COM"), the first auto-detection state. When a user data cell with "0"

(COM) in the last PTI bit arrives, the queue manager transitions the connection to state 34, ("Waiting for EOM"). If the AAL type uses both COM and EOM in the PTI, as AAL5 does, then when a user data cell with "1" (EOM) in the last PTI bit arrives, the queue manager enables packet discarding, and the connection moves to the packet discarding operating states, described below.

Upon enablement of a packet discard state, either by the operator or as a result of detection of cells in an AAL5 frame, the connection is in state 36 ("EPD & PPD Enabled"). When a user data cell with the last PTI bit set to "0" (COM) arrives, the connection moves to state 38 ("Frame in Progress"). If the entire frame passes through the switch without any cells being discarded, the connection returns to state 36. This occurs when a cell with EOM is received or placed into a buffer queue ("EOM Enqueued or Received"). On the other hand, if the switch discards a cell for any reason before the entire frame passes, the switch activates the PPD feature, moving the connection from state 38 to state 40 ("PPD Active"). The PPD feature discards the remaining ATM cells belonging to the AAL5 frame. When the frame ends, i.e., a cell with EOM is received or placed into queue ("EOM Enqueued or Received"), the connection returns to state 36, with EPD and PPD enabled.

If the EPD feature discards a cell before the queue manager detects a COM (e.g., because the buffers cannot accommodate the entire frame), then the connection moves from state 36 immediately into state 42 ("EPD Active"). In this state, all remaining ATM cells from the AAL5 frame are discarded. Since the EPD feature discards the first cell from a frame and then all remaining cells, EPD discards an entire frame. When a cell with EOM arrives, the entire frame has been received, and the connection returns to state 36.

While the connection is in state 40 ("PPD Active") or state 42 ("EPD Active"), the switch discards all received user data cells with the last PTI bit set to "0" (COM), i.e., any user data cell that is not the last from the frame. In state 42, the switch also discards any cell with EOM (i.e., the last cell in a frame), because EPD discards all cells in a frame, and no reassembly of the frame occurs downstream. In state 40 ("PPD Active"), however, the PPD feature will try to avoid discarding the last cell of a frame (i.e., the EOM cell) so as not to invalidate the reassembly of a subsequent frame at a downstream point. However, congestion at a switch may be too severe to allow even a single EOM cell to be sent on the connection. The switch's discard policy for AAL5 EOM cells, which may be less strict than the policy for AAL5 COM cells and non-AAL5 cells in order to reduce the likelihood of subsequent AAL5 frames being invalidated, determines whether to discard the EOM cell. In cases where the EOM cell must be discarded, the connection remains in state 40 ("PPD Active") instead of returning to state 36 ("EPD & PPD Enabled") since the reassembly of the subsequent frame has been invalidated by the passing of some COM cells of the current frame without a corresponding EOM cell.

It will be appreciated by those skilled in this art that various modifications and variations can be made to the automatic frame detection strategy described herein consistent with the present invention without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A method for controlling congestion of ATM cells in an ATM switch using a packet discard feature, each cell containing a bit having at least two states indicating cell type when AAL5 is being used, the method comprising the steps of:

monitoring the state of the bit in each cell when passing through said ATM switch;

determining that the cells carry data that has been segmented using AAL5 when the state of the bit transitions from a first value to a second value, wherein the step of determining further comprises evaluating a last bit of the Payload Type Identifier (PTI) field to determine whether the last bit of the Payload Type Identifier field changes value; and enabling the packet discard feature if the user data cells carry data that has been segmented using AAL5, wherein the packet discard feature includes partial packet discard (PPD) and early packet discard (EPD).

2. A method of controlling congestion of cells on a connection in an ATM switch using a packet discard feature, each cell containing a bit having at least two states indicating cell type when AAL5 is being used, the method comprising the steps of:

conditionally enabling the packet discard feature if it is unknown at the time the connection is established whether the cells on the connection carry data that has been segmented using AAL5;

monitoring the state of the bit in each cell received at the ATM switch; and enabling the packet discard feature if the feature has been conditionally enabled and the ATM switch receives a cell with a bit in a first state followed by a cell with a bit in a second state, wherein the packet discard feature includes partial packet discard (PPD) and early packet discard (EPD).

3. The method of claim 2 further comprising the step of: enabling the packet discard feature if the cell is known to carry data that has been segmented using AAL5 at the time the connection is established, wherein the packet discard feature includes partial packet discard (PPD) and early packet discard (EPD).

4. The method of claim 2 further comprising the step of: disabling the packet discard feature if it is known at the time the connection is established that operation of the packet discard feature is inappropriate.

5. An apparatus for controlling congestion of cells in an ATM switch using a packet discard feature, each user data cell containing a bit having at least two states indicating cell type when AAL5 is being used, the apparatus comprising:

means for monitoring the state of the bit in each cell when passing through said ATM switch;

means for determining that the cells carry data that has been segmented using AAL5 when the state of the bit transitions from a first value to a second value, wherein the means for determining further comprises means for evaluating a last bit of the Payload Type Identifier (PTI)

field to determine whether the last bit of the Payload Type Identifier field changes value; and means for enabling the packet discard feature if the user data cells carry data that has been segmented using AAL5, wherein the packet discard feature includes partial packet discard (PPD) and early packet discard (EPD).

6. An apparatus for controlling congestion of cells on a connection in an ATM switch using a packet discard feature, each cell containing a bit having at least two states indicating cell type when AAL5 is being used, the apparatus comprising:

means for conditionally enabling the packet discard feature if it is unknown at the time the connection is established whether the cells on the connection carry data that has been segmented using AAL5;

means for monitoring the state of the bit in each cell received at the ATM switch;

means for enabling the packet discard feature if the feature has been conditionally enabled and the ATM switch receives a cell with a bit in a first state followed by a bit in a second state, wherein the packet discard feature includes partial packet discard (PPD) and early packet discard (EPD).

7. The apparatus of claim 6 further comprising: means for enabling the packet discard feature if the cell is known to carry data that has been segmented using AAL5 at the time the connection is established, wherein the packet discard feature includes partial packet discard (PPD) and early packet discard (EPD).

8. The apparatus of claim 6 further comprising:

means for disabling the packet discard feature if it is known at the time the connection is established that operation of the packet discard feature is inappropriate.

9. The method of claim 2, wherein the step of enabling further comprises defining the bit to comprise a last bit of the Payload Type Identifier (PTI) field.

10. The apparatus of claim 6, wherein the means for enabling further comprises means for defining the bit to comprise a last bit of the Payload Type Identifier (PTI) field.

* * * * *